US009915863B2

United States Patent
Wang et al.

(10) Patent No.: US 9,915,863 B2
(45) Date of Patent: Mar. 13, 2018

(54) PROJECTION APPARATUS AND ILLUMINATION SYSTEM

(71) Applicant: Coretronic Corporation, Hsin-Chu (TW)

(72) Inventors: Chia-Hao Wang, Hsin-Chu (TW);
Chi-Tang Hsieh, Hsin-Chu (TW);
Ko-Shun Chen, Hsin-Chu (TW);
Chi-Hsun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/169,754

(22) Filed: Jun. 1, 2016

(65) Prior Publication Data

US 2017/0059976 A1   Mar. 2, 2017

(30) Foreign Application Priority Data

Aug. 31, 2015  (TW) .............................. 104128572 A

(51) Int. Cl.
*G03B 21/20* (2006.01)
*H04N 9/31* (2006.01)
(Continued)

(52) U.S. Cl.
CPC ......... *G03B 21/208* (2013.01); *G02B 3/0006* (2013.01); *G02B 13/16* (2013.01);
(Continued)

(58) Field of Classification Search
CPC .... G03B 21/28; G03B 21/204; G03B 21/208; G03B 21/2013; G03B 21/2033;
(Continued)

(56) References Cited

U.S. PATENT DOCUMENTS

| 7,651,243 B2 | 1/2010 | McGuire, Jr. et al. |
| 2004/0061839 A1* | 4/2004 | Kim ..................... H04N 9/3117 353/94 |

(Continued)

FOREIGN PATENT DOCUMENTS

| CN | 103062672 | 4/2013 |
| JP | 2014240912 | 12/2014 |

(Continued)

OTHER PUBLICATIONS

"Office Action of Taiwan Counterpart Application", dated Aug. 5, 2016, p. 1-p. 8, in which the listed references were cited.

(Continued)

*Primary Examiner* — Sultan Chowdhury
(74) *Attorney, Agent, or Firm* — JCIPRNET

(57) ABSTRACT

An illumination system including a coherent light source device, a light delivery module, and a light wavelength conversion module is provided. The coherent light source device includes a light emitting source and a light collimating element. The light emitting source is adapted to emit at least one coherent light beam. The light collimating element is located on a transmission path of the at least one coherent light beam from the light emitting source and collimates the at least one coherent light beam. The light delivery module is located on a transmission path of at least one coherent light beam from the light collimating element and includes a first lens. The first lens has a lens array surface adapted to diverge any of the coherent light beam from the light collimating element. A projection apparatus is also provided.

20 Claims, 7 Drawing Sheets

(51) Int. Cl.
*G02B 3/00* (2006.01)
*G02B 13/16* (2006.01)
*G03B 21/16* (2006.01)
*G03B 33/08* (2006.01)
*G02B 27/30* (2006.01)

(52) U.S. Cl.
CPC ........... *G03B 21/16* (2013.01); *G03B 21/204* (2013.01); *G03B 33/08* (2013.01); *H04N 9/3111* (2013.01); *H04N 9/3161* (2013.01); *H04N 9/3164* (2013.01); *G02B 27/30* (2013.01)

(58) Field of Classification Search
CPC .. G02B 27/09; G02B 27/283; G02B 27/0133; G02B 27/1053; H04N 9/3152; H04N 9/3161; H04N 9/3164
See application file for complete search history.

(56) References Cited

U.S. PATENT DOCUMENTS

| | | | |
|---|---|---|---|
| 2006/0238720 A1 | 10/2006 | Lee et al. | |
| 2012/0300178 A1* | 11/2012 | Sugiyama | H04N 9/3111 353/31 |
| 2012/0327377 A1 | 12/2012 | Ohsugi | |
| 2013/0215401 A1* | 8/2013 | Inoko | G02B 27/0905 353/102 |
| 2014/0028982 A1* | 1/2014 | Hadrath | G03B 21/28 353/20 |
| 2015/0309399 A1* | 10/2015 | Kim | F21V 13/14 353/33 |
| 2015/0323861 A1* | 11/2015 | Saitou | G03B 21/2013 353/31 |
| 2015/0377430 A1* | 12/2015 | Bhakta | F21S 48/1145 362/84 |
| 2016/0091783 A1* | 3/2016 | Hu | G03B 21/14 362/553 |

FOREIGN PATENT DOCUMENTS

| | | |
|---|---|---|
| KR | 20140142532 | 12/2014 |
| TW | 201213858 | 4/2012 |
| TW | M482090 | 7/2014 |
| TW | 201516460 | 5/2015 |
| TW | 201523167 | 6/2015 |

OTHER PUBLICATIONS

"Office Action of China Counterpart Application," dated Dec. 4, 2017, p. 1-p. 6, in which the listed references were cited.

* cited by examiner

PROJECTION APPARATUS AND ILLUMINATION SYSTEM

CROSS-REFERENCE TO RELATED APPLICATION

This application claims the priority benefit of Taiwan application serial no. 104128572, filed on Aug. 31, 2015. The entirety of the above-mentioned patent application is hereby incorporated by reference herein and made a part of this specification.

FIELD OF DISCLOSURE

The invention relates to an image apparatus and an optical system; more particularly, the invention relates to a projection apparatus and an illumination system.

DESCRIPTION OF RELATED ART

A laser projection apparatus generates a pure color light beam required for projection by utilizing a laser beam emitted by a laser diode to excite a fluorescent powder layer on a fluorescent wheel. To comply with the demands of the high-end market, the output brightness of the laser projection apparatus is repetitively required to be improved, and so is the laser power of the laser diode. However, given that the laser energy is enhanced and is overly concentrated on the fluorescent powder layer, the conversion efficiency of the fluorescent powder is reduced; thereby, the laser energy is left in form of heat on the fluorescent powder layer. As a result, the increase in the temperature of the fluorescent powder layer may lead to formation of burned marks on the fluorescent powder layer.

To resolve said issue, a diffusion film may be arranged on a transmission path of the laser beam to the fluorescent wheel according to the related art, so as to homogenize the energy through laser spot diffusion. However, the diffusion film itself may result in energy consumption. Besides, the diffusion direction of the diffusion film is isotropic. In the event that the long axis and the short axis of a light spot of the laser beam are both diffused by the diffusion film, the long axis of the laser spot generated on the fluorescent powder layer may be overly long, which causes the difficulty in optical coupling and the reduction of energy utilization efficiency.

The information disclosed in this Related Art section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection apparatus characterized by ideal output brightness and favorable energy utilization efficiency.

The invention is also directed to an illumination system capable of resolving issues resulting from the enhanced and overly concentrated coherent light beam energy.

Other objectives and advantages of the invention can be further illustrated by the technical features broadly embodied and described as follows.

In order to achieve at least one of the objects or other objects, an embodiment of the invention provides a projection apparatus that includes an illumination system, a light valve, and a projection lens. The illumination system includes a coherent light source device, a light delivery module, and a light wavelength conversion module is provided. The coherent light source device includes a light emitting source and a light collimating element. The light emitting source is adapted to emit at least one coherent light beam. The light collimating element is located on a transmission path of the at least one coherent light beam from the light emitting source and collimates the at least one coherent light beam. The light delivery module is located on a transmission path of the at least one coherent light beam from the light collimating element and includes a first lens. The first lens has a lens array surface. The lens array surface is adapted to diverge any of the at least one coherent light beam from the light collimating element. The light wavelength conversion module is arranged on the transmission path of the at least one coherent light beam from the light delivery module. The light wavelength conversion module is adapted to convert one portion of the at least one coherent light beam into a converted light beam. A wavelength of the converted light beam is different from a wavelength of the at least one coherent light beam, and the converted light beam and the other portion of the at least one coherent light beam constitute an illumination beam. The light valve is arranged on a transmission path of the illumination beam to convert the illumination beam into an image beam. The projection lens is located on a transmission path of the image beam.

In order to achieve at least one of the objects or other objects, an embodiment of the invention provides an illumination system that includes a coherent light source device, a light delivery module, and a light wavelength conversion module. The coherent light source device includes a light emitting source and a light collimating element. The light emitting source is adapted to emit at least one coherent light beam. The light collimating element is located on a transmission path of the at least one coherent light beam from the light emitting source and collimates the at least one coherent light beam. The light delivery module is located on a transmission path of the at least one coherent light beam from the light collimating element and includes a first lens. The first lens has a lens array surface. The lens array surface is adapted to diverge any of the at least one coherent light beam from the light collimating element. The light wavelength conversion module is arranged on the transmission path of the at least one coherent light beam from the light delivery module. The light wavelength conversion module is adapted to convert one portion of the at least one coherent light beam into a converted light beam. A wavelength of the converted light beam is different from a wavelength of the at least one coherent light beam.

In view of the above, the projection apparatus and the illumination system provided herein may achieve at least one of advantages or effects as listed below. The lens array surface of the first lens is able to diverge the coherent light beam and homogenize the energy; therefore, the illumination system provided herein may reduce the energy concentration of the coherent light beam on the light wavelength conversion module and further resolve the issue resulting from the enhanced and overly concentrated coherent light beam energy. Moreover, the illumination system provided herein does not require a diffusion film; accordingly, the conventional issues of energy loss, optical coupling difficulty, and reduction of energy utilization efficiency can be resolved, and the resultant projection apparatus may be characterized by ideal output brightness and favorable energy utilization efficiency.

Other objectives, features and advantages of the invention will be further understood from the further technological features disclosed by the embodiments of the invention wherein there are shown and described preferred embodiments of the invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
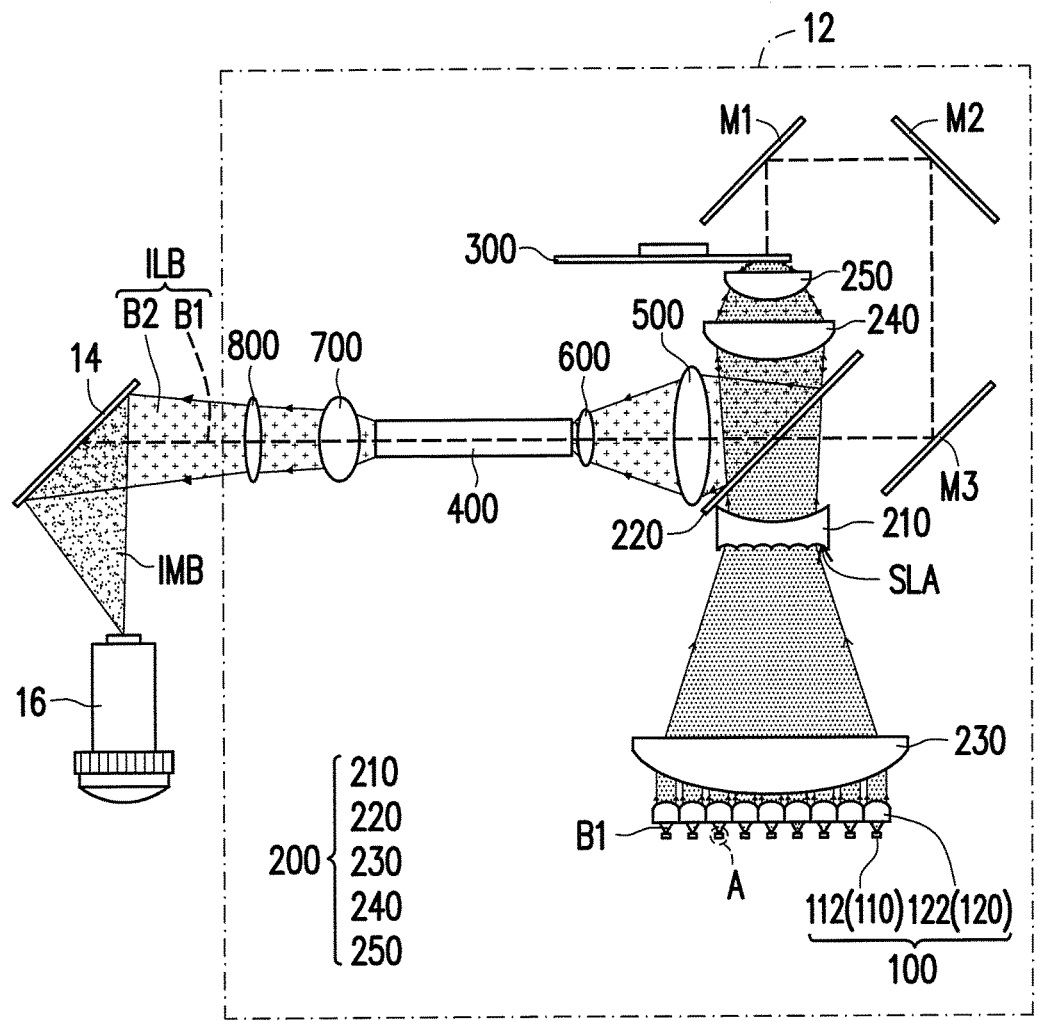
FIG. 1A is a schematic diagram illustrating a projection apparatus according to a first embodiment of the invention.
Figure 1B:
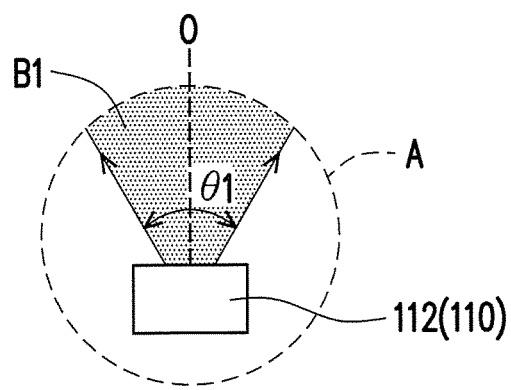
FIG. 1B is a schematic enlarged view illustrating the area A depicted in FIG. 1A.
Figure 1C:
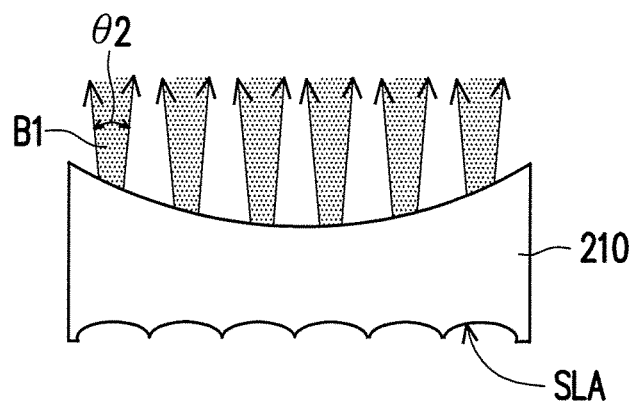
FIG. 1C is a schematic enlarged view illustrating the first lens depicted in FIG. 1A according to an embodiment of the invention.
Figure 1D:
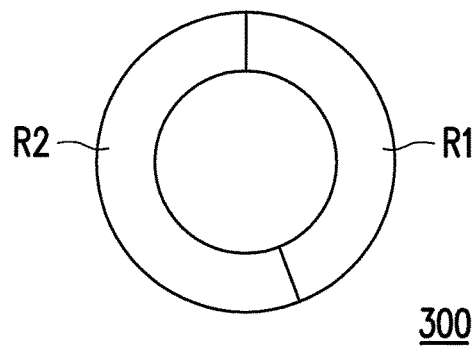
FIG. 1D is a schematic front view illustrating a light wavelength conversion module depicted in FIG. 1A.
Figure 1E:
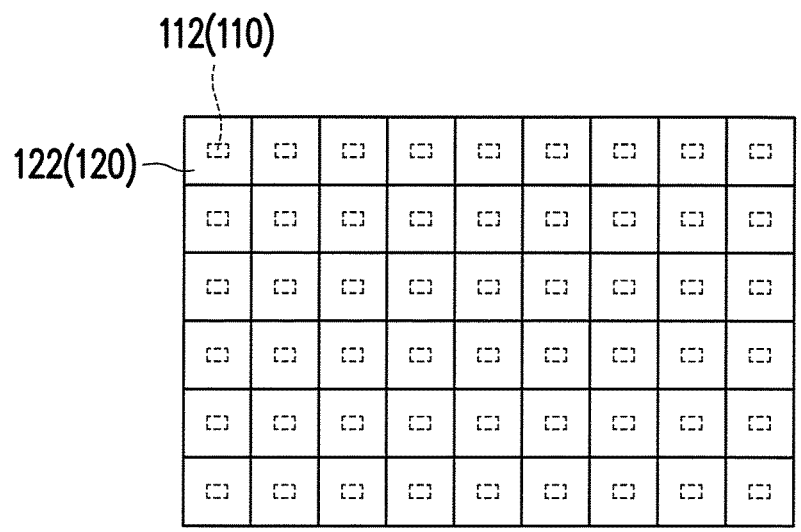
FIG. 1E is a schematic front view illustrating the coherent light source device depicted in FIG. 1A.
Figure 1F:
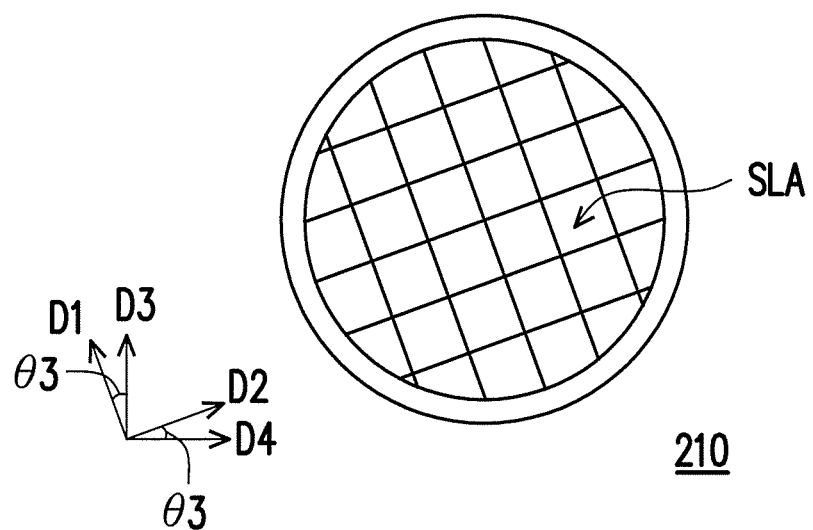
FIG. 1F is a schematic front view illustrating the lens array surface of the first lens depicted in FIG. 1A.

FIG. 1A is a schematic diagram illustrating a projection apparatus according to a first embodiment of the invention. FIG. 1B is a schematic enlarged view illustrating the area A depicted in FIG. 1A. FIG. 1C is a schematic enlarged view illustrating the first lens depicted in FIG. 1A according to an embodiment of the invention. FIG. 1D is a schematic front view illustrating a light wavelength conversion module depicted in FIG. 1A. FIG. 1E is a schematic front view illustrating the coherent light source device depicted in FIG. 1A. FIG. 1F is a schematic front view illustrating the lens array surface of the first lens depicted in FIG. 1A.

With reference to FIG. 1A to FIG. 1F, a projection apparatus 10 includes an illumination system 12, a light valve 14, and a projection lens 16. The illumination system 12 provides an illumination beam ILB. The light valve 14 is arranged on a transmission path of the illumination beam ILB to convert the illumination beam ILB into an image beam IMB. For instance, the light valve 14 may be a digital micro-mirror device (DMD), a liquid-crystal-on-silicon panel (LCOS panel), or any other appropriate spatial light modulator (SLM). The projection lens 16 is arranged on the transmission path of the image beam IMB and is capable of projecting the image beam IMB coming from the light valve 14 onto a screen, a wall, or any other object where images can be formed.

The illumination system 12 includes a coherent light source device 100, a light delivery module 200, and a light wavelength conversion module 300. The coherent light source device 100 includes a light emitting source 110 and a light collimating element 120. The light emitting source 110 is adapted to emit at least one coherent light beam B1. For instance, the light emitting source 110 may be a laser light emitting source, the coherent light beam B1 may be a laser beam, and the color of the laser beam may be blue; however, the invention is not limited thereto. As shown in FIG. 1E, the light emitting source 100 provided in the embodiment may include a plurality of coherent light emitting elements 112 arranged in an array. The coherent light emitting elements 112 may be laser diodes, which should however not be construed as a limitation to the invention. Besides, the number of the coherent light emitting elements 112 may be adjusted according to the demand for the brightness of the projection apparatus 10 and should not be limited to that depicted in FIG. 1E.

The light collimating element 120 is located on a transmission path of the at least one coherent light beam B1 from the light emitting source 110 and collimates the at least one coherent light beam B1 coming from the coherent light emitting elements 112. As shown in FIG. 1B, the coherent light beam B1 emitted by each of the coherent light emitting elements 112 has a divergence angle θ1. For instance, the divergence angle θ1 of a coherent light beam emitted by an exemplary laser diode may be approximately 20 degrees. The coherent light beam B1 emitted by the coherent light emitting element 112 may be converged by the light collimating element 120, such that the coherent light beam B1 passing through the light collimating element 120 may be transmitted in a direction parallel to an optical axis O of the coherent light emitting element 112. As a result, the coherent light beam B1 may be collimated, and the issue of energy loss caused by the divergence of the coherent light beam B1 may be resolved. As shown in FIG. 1E, the light collimating element 120 provided in the embodiment may include a plurality of collimating lenses 122 arranged in an array. In the embodiment, each collimating lens 122 corresponds to one coherent light emitting element 112. Namely, the number of the coherent light emitting elements 112 is equal to the number of the collimating lenses 122 according to the embodiment.

The light delivery module 200 is located on a transmission path of the at least one coherent light beam B1 from the light collimating element 120 and includes a first lens 210. The first lens 210 has a lens array surface SLA. The lens array surface SLA is adapted to diverge any of the at least one coherent light beam B1 from the light collimating element 120. As shown in FIG. 1A and FIG. 1F, the lens array surface SLA includes a plurality of curved surfaces arranged in an array, for instance. Through the setting of parameters of the curved surfaces of the lens array surface SLA, e.g., the curvature of the curved surfaces, the value (positive or negative) of the curved surfaces, the number of the curved surfaces, the arrangement directions D1 and D2 of the curved surfaces, and the pitch of the curved surfaces in the arrangement directions D1 and D2, the coherent light beam B1 that passes any of the curved surface may have the divergence angle θ2 greater than 0 degree but smaller than or equal to 4 degrees according to the embodiment. Moreover, in the embodiment, the arrangement directions D1 and D2 of the curved surfaces may be orthogonal to each other; however, the invention is not limited thereto.

In the embodiment, the coherent light beam B1 is properly diverged; thereby, the conventional issues caused by the overly diverged coherent light beam B1 (e.g., energy loss, optical coupling difficulty, and reduction of energy utilization efficiency) can be resolved, and energy can be homogenized. Besides, the setting of parameters of the curved surfaces of the lens array surface SLA may be adjusted according to the structure of the projection apparatus 10 in the embodiment, so as to optimize the energy and the shape of the light spot. The resultant projection apparatus 10 is thus characterized by ideal output brightness and favorable energy utilization efficiency.

According to the embodiment, the setting of parameters of the curved surfaces of the lens array surface SLA (e.g., the curvature of the curved surfaces, the value (positive or negative) of the curved surfaces, the number of the curved surfaces, the arrangement directions D1 and D2 of the curved surfaces, and the pitch of the curved surfaces in the arrangement directions D1 and D2) may be adjusted in response to different demands. For instance, as shown in FIG. 1E and FIG. 1F, the arrangement directions D1 and D2 of the curved surfaces of the lens array surface SLA may be tilted at an angle θ3 relative to the arrangement directions D3 and D4 of the coherent light emitting elements 112 (or the collimating lenses 122). In the embodiment, the angle θ3 ranges from 0 degree to 90 degrees. Practically, said tilted angle may be achieved by rotating the first lens 210. In the embodiment, the arrangement directions D3 and D4 of the coherent light emitting elements 112 are orthogonal to each other; however, the invention is not limited thereto. As provided in the aforementioned design, the light spot of the coherent light beam B1 formed on the light wavelength conversion module 300 may corresponds to the light homogenization element, which will be elaborated hereinafter.

In the embodiment, the curved surfaces of the lens array surface SLA and the collimating lenses 122 may not be correlated in a one-on-one manner. For instance, the number of the curved surfaces of the lens array surface SLA may be less than the number of the collimating lenses 122, which should however not be construed as a limitation to the invention. In addition, the curved surfaces of the lens array surface SLA may be dented toward the inside of the first lens 210, and the lens array surface SLA may be a surface of the first lens 210 facing the coherent light source device 100; however, the invention is not limited thereto.

Figure 2:
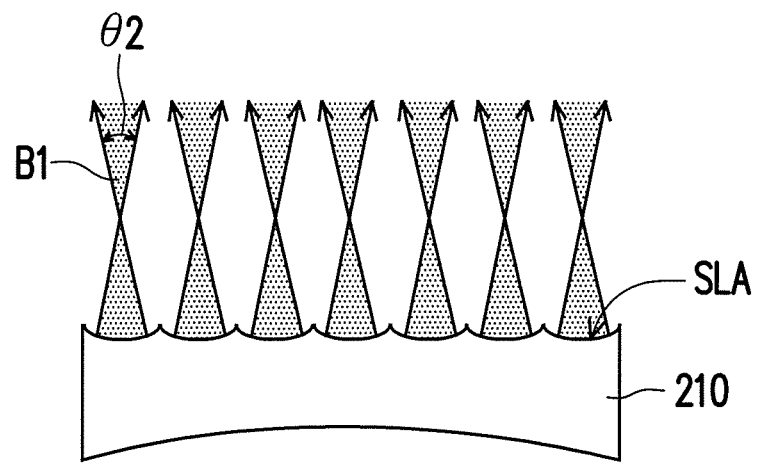
FIG. 2 is a schematic view illustrating the first lens depicted in FIG. 1A according to another embodiment of the invention.

According to another embodiment, as shown in FIG. 2, the lens array surface SLA may also be a surface of the first lens 210 facing the light wavelength conversion module 300 (shown in FIG. 1A). Based on the design shown in FIG. 2, after the at least one coherent light beam B1 passes through the first lens 210, the coherent light beam B1 is converged and then diverged. As such, energy homogenization may also be achieved.

The light wavelength conversion module 300 is arranged on the transmission path of the at least one coherent light beam B1 from the light delivery module 200. Besides, the light wavelength conversion module 300 is adapted to convert one portion of the coherent light beam B1 into a converted light beam B2, and the other portion of the coherent light beam B1 and the converted light beam B2 may together constitute the illumination beam ILB. Here, the wavelength of the converted light beam B2 is different from the wavelength of the coherent light beam B1. In the embodiment, the light wavelength conversion module 300 is a fluorescent wheel and may be a transmissive fluorescent wheel or a reflective fluorescent wheel, for instance; however, the invention is not limited thereto. The following descriptions are provided on the condition that the light wavelength conversion module 300 is the reflective fluorescent wheel.

As shown in FIG. 1D, in the embodiment, the light wavelength conversion module 300 may include a light transparent area R1 and at least one wavelength conversion area R2; however, the invention is not limited thereto. With reference to FIG. 1A and FIG. 1D, in the embodiment, a fluorescent powder layer (not shown) may be arranged in the wavelength conversion area R2, so as to convert one portion of the coherent light beam B1 into the converted light beam B2. For instance, a yellow fluorescent powder layer may be arranged in the wavelength conversion area R2, so as to convert the blue coherent light beam B1 into the yellow converted light beam B2, which should not be construed as a limitation to the invention. In other embodiments, in order to increase the color variety of the illumination system 12, other wavelength conversion areas may be further arranged in the light wavelength conversion module 300, and different fluorescent powder layers in different colors may be arranged in different wavelength conversion areas, so as to form the converted light beam B2 in multiple colors.

In the embodiment, the light wavelength conversion module 300 may further include a substrate plate (not shown) for holding the fluorescent powder layer. The substrate plate may be a light reflective plate or a light transmissive plate. In an embodiment of the invention, if the light wavelength conversion module 300 is equipped with the light reflective plate, the substrate plate may be made of metal, alloy, or a combination thereof, and the light transparent area R1 may be formed by hollowing out the light reflective plate. In another embodiment of the invention, if the light wavelength conversion module 300 is equipped with the light transparent plate, the light wavelength conversion module 300 may further include a light reflective element (not shown) arranged on the wavelength conversion area R2, so as to reflect the converted light beam B2 back to the light delivery module 200. Here, the light reflective element is arranged between the fluorescent powder layer and the substrate plate.

According to the embodiment, when the light wavelength conversion module 300 rotates, the light transparent area R1 and the wavelength conversion area R2 may cut into the transmission path of the coherent light beam B1 in turns. When the coherent light beam B1 irradiates the light transparent area R1 of the light wavelength conversion module 300, the coherent light beam B1 passes through the light transparent area R1. When the coherent light beam B1 irradiates the wavelength conversion area R2, the wavelength conversion area R2 converts the coherent light beam B1 into a converted light beam B2. Before the coherent light beam B1 is transmitted to the wavelength conversion area R2, the coherent light beam B1 has passed through the lens array surface SLA, and the energy has been homogenized. Hence, the energy concentration of the coherent light beam B1 on the light wavelength conversion module 300 can be reduced, and the aforesaid issues resulting from the enhanced and overly concentrated energy (such as the reduced conversion efficiency of the fluorescent powder layer, the increase in the temperature of the fluorescent powder layer, and the formation of burned marks) can be resolved.

In the embodiment, the light delivery module 200 may further include a light combination element 220. As shown in FIG. 1A, in the embodiment, the light combination element 220 is arranged between the coherent light source device 100 and the light wavelength conversion module 300, and the first lens 210 can be arranged between the coherent light source device 100 and the light combination element 220, which should however not be construed as limitations to the invention. In another embodiment, the first lens 210 may also be arranged between the light combination element 220 and the light wavelength conversion module 300 (which will be elaborated hereinafter).

Besides, according to the embodiment, the light delivery module 200 may further include a second lens 230, a third lens 240, and a fourth lens 250 sequentially arranged from the coherent light source device 100 to the light wavelength conversion module 300, wherein the first lens 210 is arranged between the second lens 230 and the third lens 240, and the light combination element 220 is arranged between the first lens 210 and the third lens 240. Refractive powers of the second lens 230, the first lens 210, the third lens 240, and the fourth lens 250 are sequentially positive, negative, positive, and positive. From another perspective, in the embodiment, the second lens 230 has a convex surface facing the coherent light source device 100, the first lens 210 is a biconcave lens with the lens array surface SLA, the third lens 240 has a convex surface facing the coherent light source device 100, and the fourth lens 250 has a convex surface facing the coherent light source device 100, for instance.

The coherent light beam B1 coming from the coherent light source device 100 is transmitted to the light wavelength conversion module 300 sequentially through the light collimating element 120, the second lens 230, the first lens 210, the light combination element 220, the third lens 240, and the fourth lens 250. When the wavelength conversion area R2 cuts into the transmission path of the coherent light beam B1, the wavelength conversion area R2 converts the coherent light beam B1 into the converted light beam B2 and reflects the converted light beam B2, and the reflected converted light beam B2 returns to the light combination element 220 sequentially through the fourth lens 250 and the third lens 240. On the other hand, when the light transparent area R1 of the light wavelength conversion module 300 cuts into the transmission path of the coherent light beam B1, the coherent light beam B1 passes through the light transparent area R1, is sequentially reflected by reflective mirrors M1, M2, and M3 in the illumination system 12, and then is directed to the light combination element 220. The light combination element 220 combines the coherent light beam B1 coming from the reflective mirror M3 with the converted light beam B2 coming from the third lens 240 to generate the illumination beam ILB and transmits the illumination beam ILB toward the light valve 14.

However, in response to different demands, the illumination system 12 may further include other elements. For instance, the illumination system 12 may further include a light homogenization element 400. The light homogenization element 400 is arranged on the transmission path of the illumination beam ILB from the light combination element 220, so as to further homogenize the illumination beam ILB. The light homogenization element 400 may be a light integration rod or a lens array. In order for the light spot of the coherent light beam B1 formed on the light wavelength conversion module 300 to correspond to the light homogenization element 400, as shown in FIG. 1A, FIG. 1E, and FIG. 1F, the arrangement directions D1 and D2 of the curved surfaces of the lens array surface SLA may be tilted at an angle θ3 relative to arrangement directions D3 and D4 of the coherent light emitting elements 112 (or the collimating lenses 122), so as to properly adjust the size of the light spot on the light wavelength conversion module 300 in response to the design demands of various laser spots. Moreover, the illumination system 12 may further include a plurality of light converging elements 500, 600, 700, and 800, e.g., light converging lenses. In the embodiment, the light converging elements 500 and 600 are arranged between the light combination element 220 and the light homogenization element 400, so as to converge the illumination beam ILB coming from the light combination element 220 into the light homogenization element 400. The light converging elements 700 and 800 are arranged between the light homogenization element 400 and the light valve 14, so as to transmit the illumination beam ILB coming from the light homogenization element 400 to the light valve 14.

Figure 3:
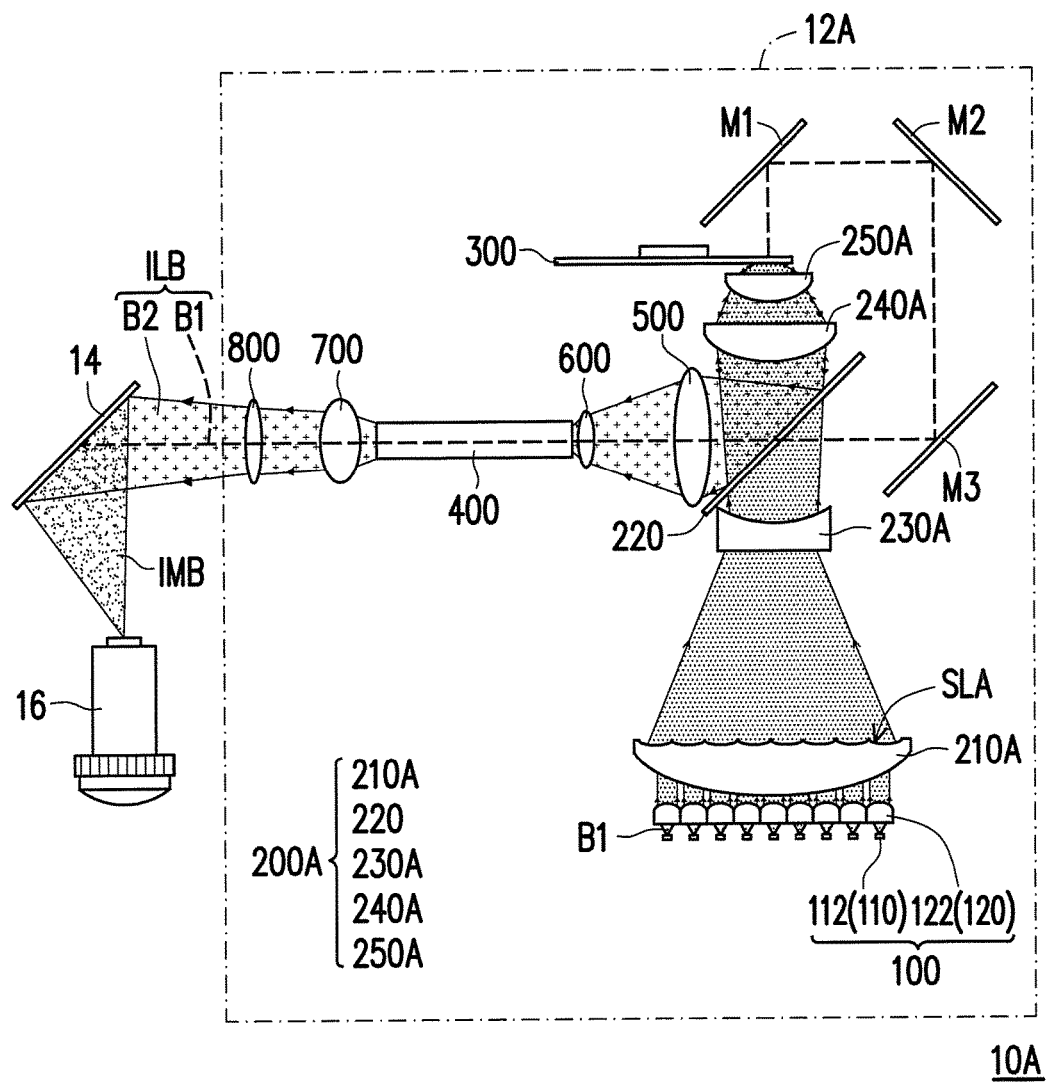
FIG. 3 to FIG. 6 are schematic views illustrating a projection apparatus according to a second embodiment to a fifth embodiment of the invention.
Figure 5:
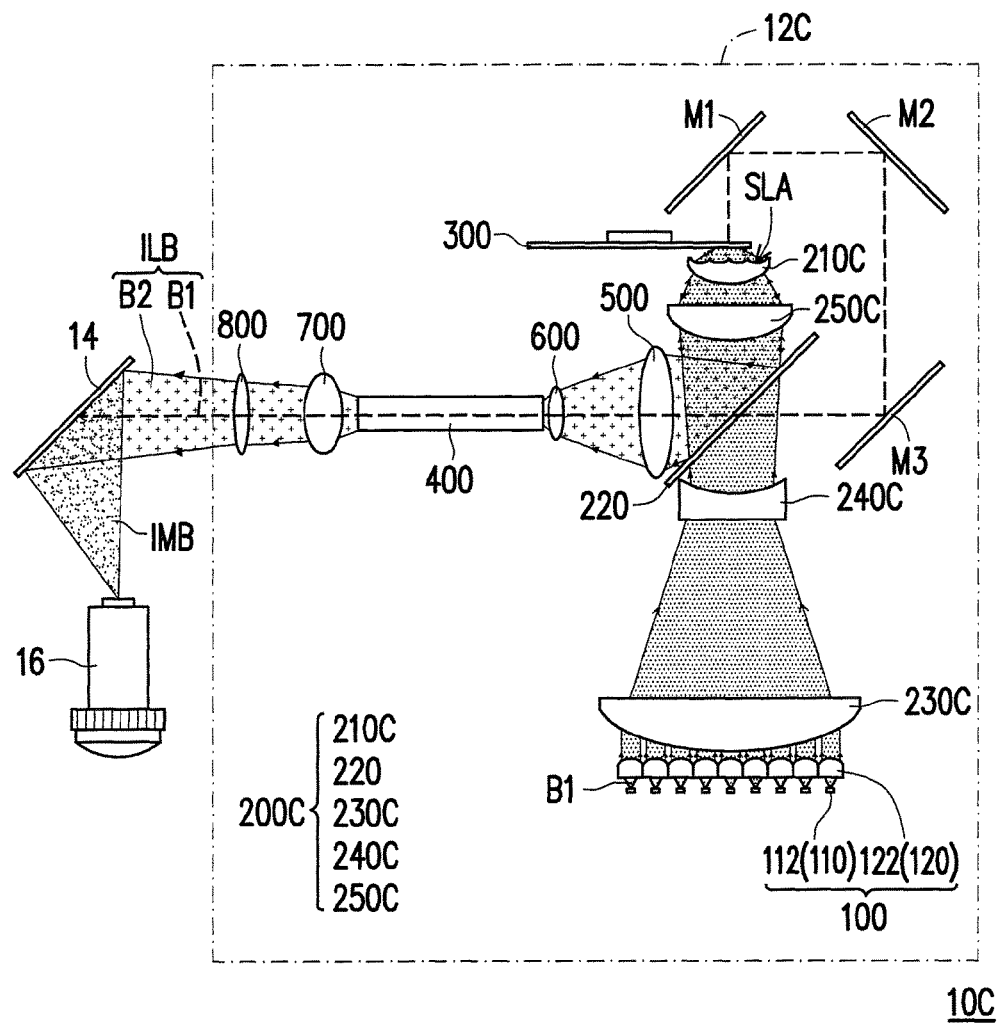
Figure 6:
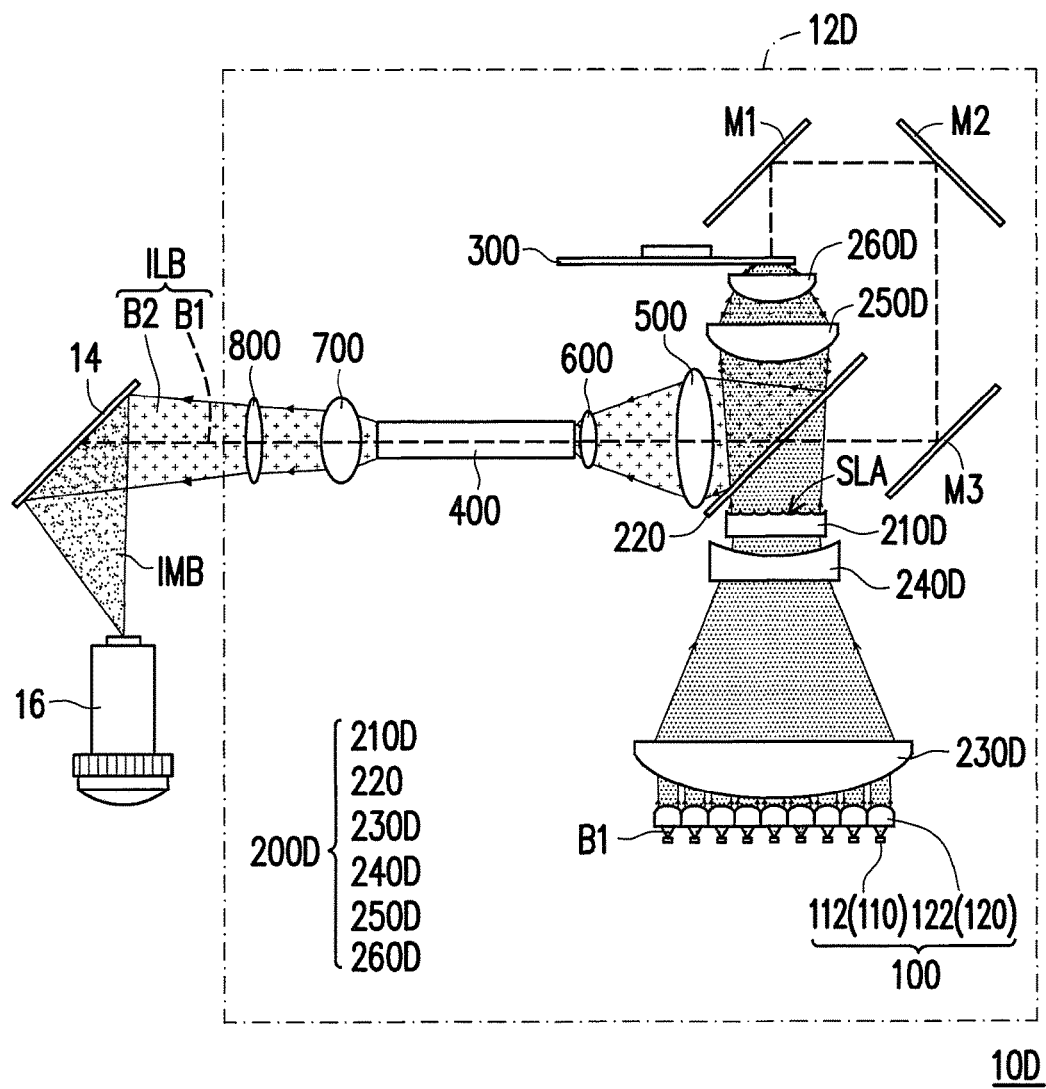

FIG. 3 and FIG. 6 are schematic views illustrating a projection apparatus according to a second embodiment to a fifth embodiment of the invention. With reference to FIG. 3 to FIG. 6, the projection apparatuses 10A, 10B, 10C, and 10D are similar to the projection apparatus 10, and the same or similar elements are represented by the same or similar reference numbers. Therefore, no further descriptions are provided herein. The difference among the projection apparatuses 10, 10A, 10B, 10C, and 10D lies in the design of the light delivery modules 200, 200A, 200B, 200C, and 200D in the illumination systems 12, 12A, 12B, 12C, and 12D.

To be specific, as shown in FIG. 3, in the light delivery module 200A, the first lens 21 OA is arranged between the coherent light source device 100 and the second lens 230A. The refractive powers of the first lens 210A, the second lens 230A, the third lens 240A, and the fourth lens 250A are sequentially positive, negative, positive, and positive. From another perspective, in the embodiment, the first lens 210A has a convex surface facing the coherent light source device 100 and has the lens array surface SLA facing the light wavelength conversion module 300, the second lens 230A has a concave surface facing the light wavelength conversion module 300, the third lens 240A has a convex surface facing the coherent light source device 100, and the fourth lens 250A has a convex surface facing the coherent light source device 100, for instance. Under such design, the coherent light beam B1 coming from the coherent light source device 100 is transmitted to the light wavelength conversion module 300 sequentially through the light collimating element 120, the first lens 210A, the second lens 230A, the light combination element 220, the third lens 240A, and the fourth lens 250A. Besides, the converted light beam B2 reflected by the light wavelength conversion module 300 returns to the light combination element 220 after sequentially passing through the fourth lens 250A and the third lens 240A. According to the embodiment as shown in FIG. 3, the lens array surface SLA may also be a surface of the first lens 210A facing the light wavelength conversion module 300, which should however not be construed as a limitation to the invention. According to another embodiment, the lens array surface SLA may be a surface of the first lens 210A facing the coherent light source device 100.

Figure 4:
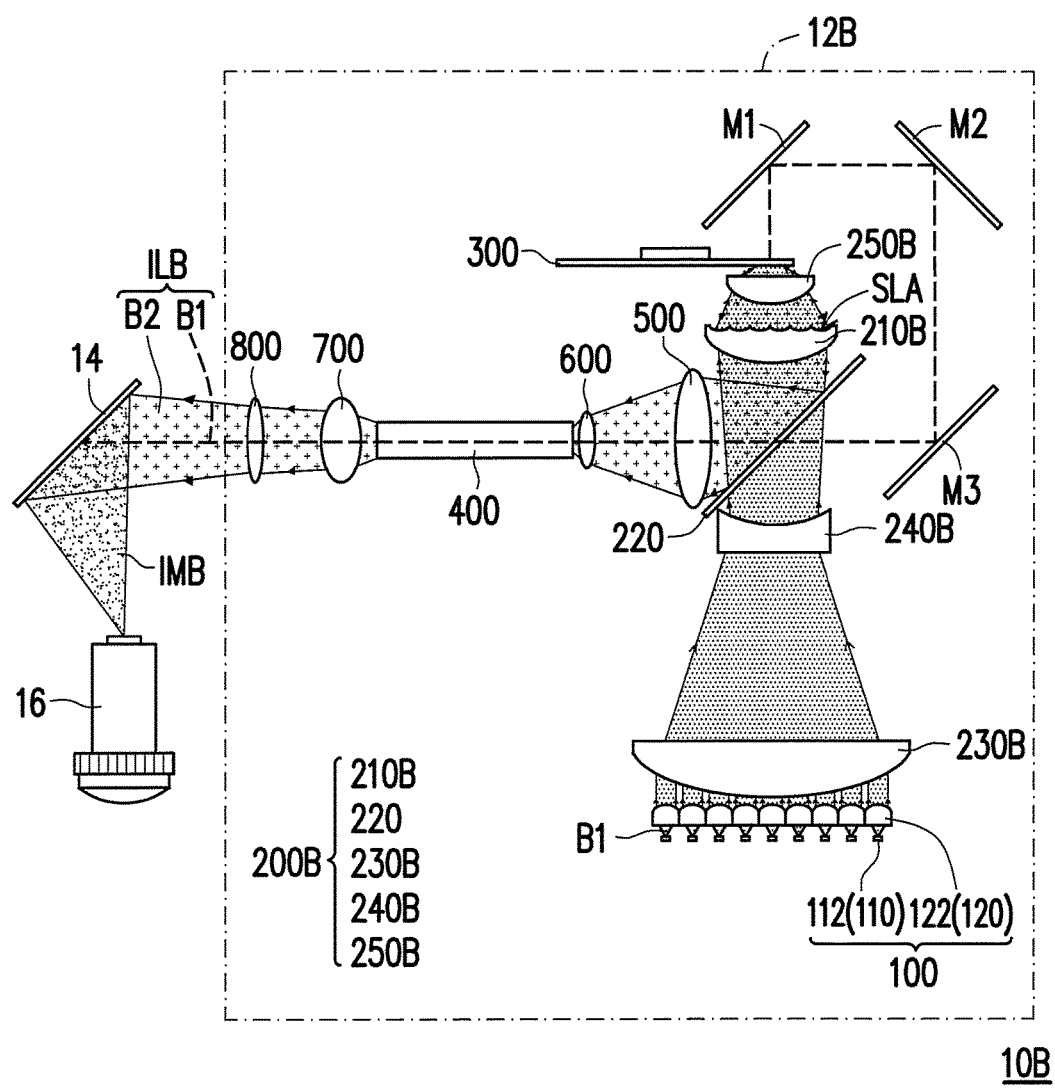

As shown in FIG. 4, in the light delivery module 200B, the first lens 210B is arranged between the third lens 240B and the fourth lens 250B. The refractive powers of the second lens 230A, the third lens 240B, the first lens 210B, and the fourth lens 250B are sequentially positive, negative, positive, and positive. From another perspective, in the embodiment, the second lens 230B has a convex surface facing the coherent light source device 100, the third lens 240B has a concave surface facing the light wavelength conversion module 300, the first lens 210B has the lens array surface SLA facing the light wavelength conversion module 300 and a convex surface facing the coherent light source device 100, and the fourth lens 250B has a convex surface facing the coherent light source device 100, for instance. Under such design, the coherent light beam B1 coming from the coherent light source device 100 is transmitted to the light wavelength conversion module 300 sequentially through the collimating element 120, the second lens 230B, the third lens 240B, the light combination element 220, the first lens 210B, and the fourth lens 250B. Besides, the converted light beam B2 reflected by the light wavelength conversion module 300 returns to the light combination element 220 after sequentially passing through the fourth lens 250B and the first lens 210B. According to the embodiment as shown in FIG. 4, the lens array surface SLA may be a surface of the first lens 210B facing the light wavelength conversion module 300, which should however not be construed as a limitation to the invention. According to another embodiment, the lens array surface SLA may be a surface of the first lens 210B facing the coherent light source device 100.

As shown in FIG. 5, in the light delivery module 200C, the first lens 210C is arranged between the fourth lens 250C and the light wavelength conversion module 300. The refractive powers of the second lens 230C, the third lens 240C, the fourth lens 250C, and the first lens 210C are sequentially positive, negative, positive, and positive. From another perspective, in the embodiment, the second lens 230C has a convex surface facing the coherent light source device 100, the third lens 240C has a concave surface facing the light wavelength conversion module 300, the fourth lens 250C has a convex surface facing the coherent light source device 100, and the first lens 210C has the lens array surface SLA facing the light wavelength conversion module 300 and a convex surface facing the coherent light source device 100, for instance. Under such design, the coherent light beam B1 coming from the coherent light source device 100 is transmitted to the light wavelength conversion module 300 sequentially through the collimating element 120, the second lens 230C, the third lens 240C, the light combination element 220, the fourth lens 250C, and the first lens 210C. Besides, the converted light beam B2 reflected by the light wavelength conversion module 300 returns to the light combination element 220 after sequentially passing through the first lens 210C and the fourth lens 250C. According to the embodiment as shown in FIG. 5, the lens array surface SLA may be a surface of the first lens 210C facing the light wavelength conversion module 300, which should however not be construed as a limitation to the invention. According to another embodiment, the lens array surface SLA may be a surface of the first lens 210C facing the coherent light source device 100.

As shown in FIG. 6, in the light delivery module 200D, the light delivery module 200D further includes a second lens 230D, a third lens 240D, a fourth lens 250D, and a fifth lens 260D sequentially arranged from the coherent light source device 100 to the light wavelength conversion module 300. The refractive powers of the second lens 230D, the third lens 240D, the fourth lens 250D, and the fifth lens 260D are sequentially positive, negative, positive, and positive. From another perspective, in the embodiment, the second lens 230D has a convex surface facing the coherent light source device 100, the third lens 240D has a concave surface facing the light wavelength conversion module 300, the fourth lens 250D has a convex surface facing the coherent light source device 100, and the fifth lens 260D has a convex surface facing the coherent light source device 100, for instance. According to the embodiment as shown in FIG. 6, the lens array surface SLA may be a surface of the first lens 210D facing the light wavelength conversion module 300, which should however not be construed as a limitation to the invention. According to another embodiment, the lens array surface SLA may be a surface of the first lens 210D facing the coherent light source device 100. Additionally, according to the embodiment, the first lens 210D is arranged between the third lens 240D and the fourth lens 250D and between the third lens 240D and the light combination element 220, which should however not be construed as limitations to the invention. In another embodiment, the first lens 210D may also be arranged between the coherent light source device 100 and the second lens 230D. In another embodiment, the first lens 210D may also be arranged between the second lens 230D and the third lens 240D. In another embodiment, the first lens 210D may also be arranged between the light combination element 220 and the fourth lens 250D. In still another embodiment, the first lens 210D may also be arranged between the fourth lens 250D and the fifth lens 260D. In another embodiment, the first lens 210D may also be arranged between the fifth lens 260D and the light wavelength conversion module 300.

To sum up, the projection apparatus and the illumination system provided in several embodiments of the invention may achieve at least one of advantages or effects as listed below. The lens array surface of the first lens may diverge the coherent light beam and homogenize the energy; therefore, the illumination system provided herein may reduce the energy concentration of the coherent light beam on the light wavelength conversion module. Moreover, the illumination system provided herein does not require a diffusion film; accordingly, the conventional issues of energy loss, optical coupling difficulty, and reduction of energy utilization efficiency can be resolved, and the resultant projection apparatus may be characterized by ideal output brightness and favorable energy utilization efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection apparatus comprising:
   an illumination system comprising:
   a coherent light source device comprising a light emitting source and a light collimating element, the light emitting source being adapted to emit at least one coherent light beam, the light collimating element being located on a transmission path of the at least one coherent light beam from the light emitting source and collimating the at least one coherent light beam;
   a light delivery module located on a transmission path of the at least one coherent light beam from the light collimating element, the light delivery module comprising a first lens having a lens array surface, the lens array surface being adapted to diverge any of the at least one coherent light beam from the light collimating element, wherein the lens array surface comprises a plurality of curved surfaces arranged in an array, and the at least one coherent light beam passing through any of the curved surfaces has a divergence angle greater than 0 degree and less than or equal to 4 degrees; and
   a light wavelength conversion module arranged on the transmission path of the at least one coherent light beam from the light delivery module and adapted to convert one portion of the at least one coherent light beam into a converted light beam, a wavelength of the converted light beam being different from a wavelength of the at least one coherent light beam, the converted light beam and the other portion of the at least one coherent light beam constituting an illumination beam;
   a light valve arranged on a transmission path of the illumination beam to convert the illumination beam into an image beam; and
   a projection lens arranged on a transmission path of the image beam.

2. The projection apparatus of claim 1, wherein the light emitting source comprises a plurality of coherent light emitting elements arranged in an array, the light collimating element comprises a plurality of collimating lenses arranged in an array, the number of the coherent light emitting elements is equal to the number of the collimating lenses, and the number of the curved surfaces is less than the number of the collimating lenses.

3. The projection apparatus of claim 1, wherein the light emitting source comprises a plurality of coherent light emitting elements arranged in an array, the light collimating element comprises a plurality of collimating lenses arranged in an array, an arrangement direction of the curved surfaces is tilted at an angle relative to an arrangement direction of the coherent light emitting elements or relative to an arrangement direction of the collimating lenses.

4. The projection apparatus of claim 1, wherein the light delivery module further comprises a light combination element arranged between the coherent light source device and the light wavelength conversion module, and the first lens is arranged between the coherent light source device and the light combination element or between the light combination element and the light wavelength conversion module.

5. The projection apparatus of claim 1, wherein the light delivery module further comprises a second lens, a third lens, and a fourth lens sequentially arranged from the coherent light source device to the light wavelength conversion module, the first lens is arranged between the coherent light source device and the second lens, and refractive powers of the first lens, the second lens, the third lens, and the fourth lens are sequentially positive, negative, positive, and positive.

6. The projection apparatus of claim 1, wherein the light delivery module further comprises a second lens, a third lens, and a fourth lens sequentially arranged from the coherent light source device to the light wavelength conversion module, the first lens is arranged between the second lens and the third lens, and refractive powers of the second lens, the first lens, the third lens, and the fourth lens are sequentially positive, negative, positive, and positive.

7. The projection apparatus of claim 1, wherein the light delivery module further comprises a second lens, a third lens, and a fourth lens sequentially arranged from the coherent light source device to the light wavelength conversion module, the first lens is arranged between the third lens and the fourth lens, and refractive powers of the second lens, the third lens, the first lens, and the fourth lens are sequentially positive, negative, positive, and positive.

8. The projection apparatus of claim 1, wherein the light delivery module further comprises a second lens, a third lens, and a fourth lens sequentially arranged from the coherent light source device to the light wavelength conversion module, the first lens is arranged between the fourth lens and the light wavelength conversion module, and refractive powers of the second lens, the third lens, the fourth lens, and the first lens are sequentially positive, negative, positive, and positive.

9. The projection apparatus of claim 1, wherein the light delivery module further comprises a second lens, a third lens, a fourth lens, and a fifth lens sequentially arranged from the coherent light source device to the light wavelength conversion module, refractive powers of the second lens, the third lens, the fourth lens, and the fifth lens are sequentially positive, negative, positive, and positive, the first lens is arranged between the coherent light source device and the second lens, between the second lens and the third lens, between the third lens and the fourth lens, between the fourth lens and the fifth lens, or between the fifth lens and the light wavelength conversion module.

10. An illumination system comprising:
a coherent light source device comprising a light emitting source and a light collimating element, the light emitting source being adapted to emit at least one coherent light beam, the light collimating element being located on a transmission path of the at least one coherent light beam from the light emitting source and collimating the at least one coherent light beam;
a light delivery module located on a transmission path of the at least one coherent light beam from the light collimating element, the light delivery module comprising a first lens having a lens array surface, the lens array surface being adapted to diverge any of the at least one coherent light beam from the light collimating element, wherein the lens array surface comprises a plurality of curved surfaces arranged in an array, and the at least one coherent light beam passing through any of the curved surfaces has a divergence angle greater than 0 degree and less than or equal to 4 degrees; and
a light wavelength conversion module arranged on the transmission path of the at least one coherent light beam from the light delivery module and adapted to convert one portion of the at least one coherent light beam into a converted light beam, a wavelength of the converted light beam being different from a wavelength of the at least one coherent light beam.

11. The illumination system of claim 10, wherein the light emitting source comprises a plurality of coherent light emitting elements arranged in an array, the light collimating element comprises a plurality of collimating lenses arranged in an array, the number of the coherent light emitting elements is equal to the number of the collimating lenses, and the number of the curved surfaces is less than the number of the collimating lenses.

12. The illumination system of claim 10, wherein the light emitting source comprises a plurality of coherent light emitting elements arranged in an array, the light collimating element comprises a plurality of collimating lenses arranged in an array, an arrangement direction of the curved surfaces is tilted at an angle relative to an arrangement direction of the coherent light emitting elements or relative to an arrangement direction of the collimating lenses.

13. The illumination system of claim 10, wherein the light delivery module further comprises a light combination element arranged between the coherent light source device and the light wavelength conversion module, and the first lens is arranged between the coherent light source device and the light combination element or between the light combination element and the light wavelength conversion module.

14. The illumination system of claim 10, wherein the light delivery module further comprises a second lens, a third lens, and a fourth lens sequentially arranged from the coherent light source device to the light wavelength conversion module, the first lens is arranged between the coherent light source device and the second lens, and refractive powers of the first lens, the second lens, the third lens, and the fourth lens are sequentially positive, negative, positive, and positive.

15. The illumination system of claim 10, wherein the light delivery module further comprises a second lens, a third lens, and a fourth lens sequentially arranged from the coherent light source device to the light wavelength conversion module, the first lens is arranged between the second lens and the third lens, and refractive powers of the second lens, the first lens, the third lens, and the fourth lens are sequentially positive, negative, positive, and positive.

16. The illumination system of claim 10, wherein the light delivery module further comprises a second lens, a third lens, and a fourth lens sequentially arranged from the coherent light source device to the light wavelength conversion module, the first lens is arranged between the third lens and the fourth lens, and refractive powers of the second lens, the third lens, the first lens, and the fourth lens are sequentially positive, negative, positive, and positive.

17. The illumination system of claim 10, wherein the light delivery module further comprises a second lens, a third lens, and a fourth lens sequentially arranged from the coherent light source device to the light wavelength conversion module, the first lens is arranged between the fourth lens and the light wavelength conversion module, and refractive powers of the second lens, the third lens, the fourth lens, and the first lens are sequentially positive, negative, positive, and positive.

18. The illumination system of claim 10, wherein the light delivery module further comprises a second lens, a third lens, a fourth lens, and a fifth lens sequentially arranged from the coherent light source device to the light wavelength conversion module, refractive powers of the second lens, the third lens, the fourth lens, and the fifth lens are sequentially positive, negative, positive, and positive, the first lens is arranged between the coherent light source device and the second lens, between the second lens and the third lens, between the third lens and the fourth lens, between the fourth lens and the fifth lens, or between the fifth lens and the light wavelength conversion module.

19. A projection apparatus comprising:
an illumination system comprising:
a coherent light source device comprising a light emitting source and a light collimating element, the light emitting source being adapted to emit at least one coherent light beam, the light collimating element being located on a transmission path of the at least one coherent light beam from the light emitting source and collimating the at least one coherent light beam;
a light delivery module located on a transmission path of the at least one coherent light beam from the light collimating element, the light delivery module comprising a first lens having a lens array surface, the lens array surface being adapted to diverge any of the at least one coherent light beam from the light collimating element, wherein the lens array surface comprises a plurality of curved surfaces arranged in an array, the light emitting source comprises a plurality of coherent light emitting elements arranged in an array, the light collimating element comprises a plurality of collimating lenses arranged in an array, the number of the coherent light emitting elements is equal to the number of the collimating lenses, and the number of the curved surfaces is less than the number of the collimating lenses; and a light wavelength conversion module arranged on the transmission path of the at least one coherent light beam from the light delivery module and adapted to convert one portion of the at least one coherent light beam into a converted light beam, a wavelength of the converted light beam being different from a wavelength of the at least one coherent light beam, the converted light beam and the other portion of the at least one coherent light beam constituting an illumination beam;

a light valve arranged on a transmission path of the illumination beam to convert the illumination beam into an image beam; and a projection lens arranged on a transmission path of the image beam.

20. An illumination system comprising:

a coherent light source device comprising a light emitting source and a light collimating element, the light emitting source being adapted to emit at least one coherent light beam, the light collimating element being located on a transmission path of the at least one coherent light beam from the light emitting source and collimating the at least one coherent light beam;

a light delivery module located on a transmission path of the at least one coherent light beam from the light collimating element, the light delivery module comprising a first lens having a lens array surface, the lens array surface being adapted to diverge any of the at least one coherent light beam from the light collimating element, wherein the lens array surface comprises a plurality of curved surfaces arranged in an array, the light emitting source comprises a plurality of coherent light emitting elements arranged in an array, the light collimating element comprises a plurality of collimating lenses arranged in an array, the number of the coherent light emitting elements is equal to the number of the collimating lenses, and the number of the curved surfaces is less than the number of the collimating lenses; and a light wavelength conversion module arranged on the transmission path of the at least one coherent light beam from the light delivery module and adapted to convert one portion of the at least one coherent light beam into a converted light beam, a wavelength of the converted light beam being different from a wavelength of the at least one coherent light beam.

* * * * *